M. PUSATERI.
RAIL JOINT.
APPLICATION FILED FEB. 16, 1915.
1,156,926.
Patented Oct. 19, 1915.
2 SHEETS—SHEET 1.
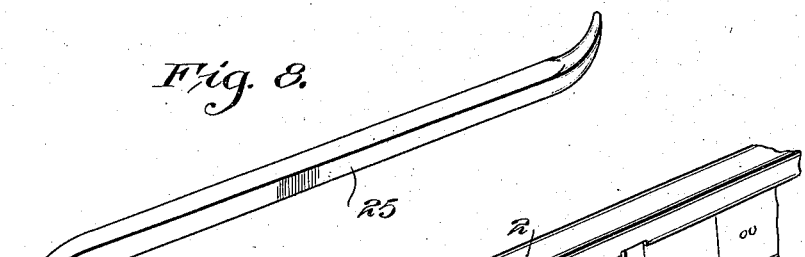
Fig. 8.
Fig. 1.
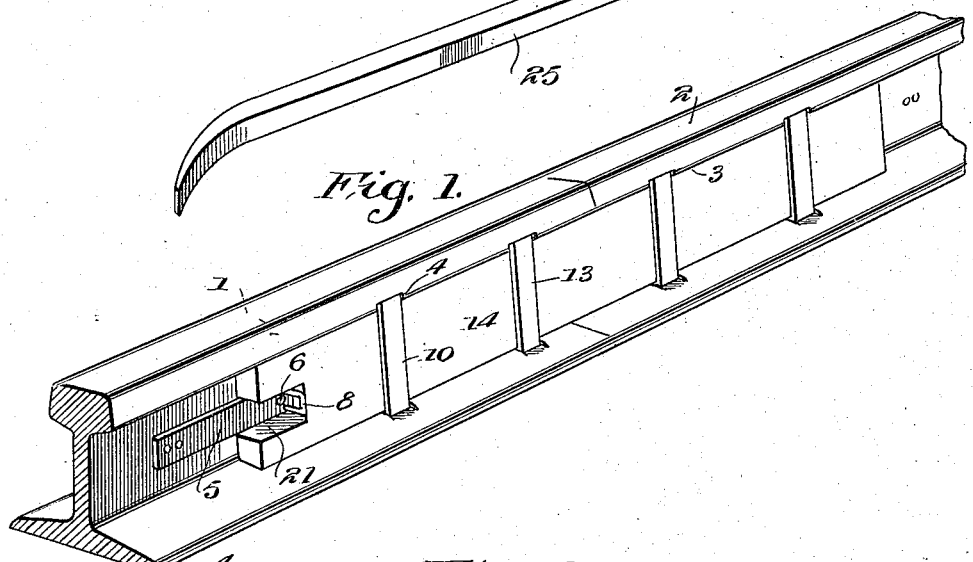
Fig. 2.
Fig. 3.
Inventor
Michael Pusateri
Witnesses
By Victor J. Evans
Attorney

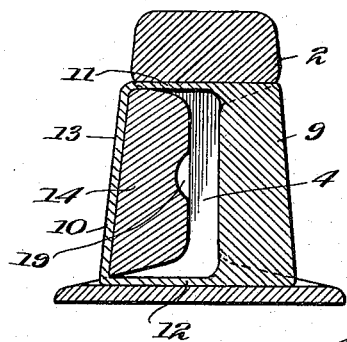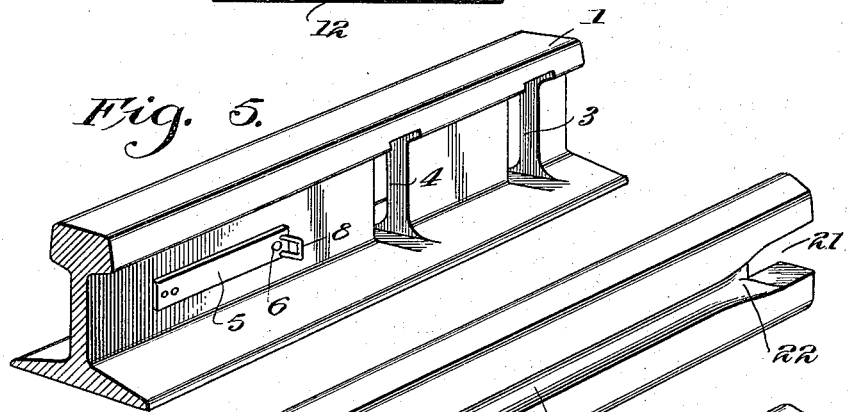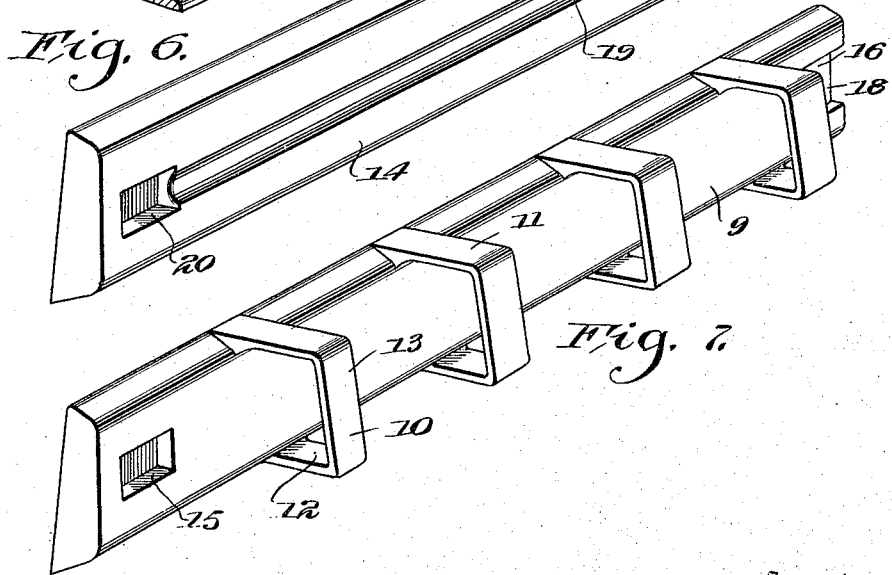

UNITED STATES PATENT OFFICE.

MICHAEL PUSATERI, OF McDONALD, PENNSYLVANIA.

RAIL-JOINT.

1,156,926.
Specification of Letters Patent.
Patented Oct. 19, 1915.

Application filed February 16, 1915. Serial No. 8,560.

*To all whom it may concern:*

Be it known that I, MICHAEL PUSATERI, a citizen of the United States, residing at McDonald, in the county of Washington and State of Pennsylvania, have invented new and useful Improvements in Rail-Joints, of which the following is a specification.

This invention relates to improvements in means for connecting the meeting ends of two railway rails.

In carrying out my invention it is my purpose to provide a rail joint wherein the fish plates are so coöperative with the rails and with each other as to effectively lock themselves within the fishing spaces of the rails to provide a secure and effective joint without the employment of nuts and bolts or analogous securing devices.

A further object of the invention is to provide the meeting ends of two rails with transverse slots or openings and to provide a fish plate for the rails having integral yoke or bail members which shall be passed through the openings and to further provide a second fish plate which shall engage between the yoke members in the opposite faces of the rails and to further provide means for locking the fish plates to the rails, and so produce a joint which will not be susceptible to lateral or vertical movement, but which at the same time is permitted a certain and desired amount of longitudinal movement incident to the expansion and contraction of the rails.

A still further object of the invention is to provide a rail joint including a fish plate having bails or yokes which pass through openings in the webs of the rails and project beyond the opposite faces of said rails and the second fish plate which is adapted to slide longitudinally of the rails between the projecting ends of the yokes and to be engaged by the said yokes and thereby forced into contact with the webs between the heads and base flanges of the rail, and to further provide locking means carried by the rails for coöperating with the fish plates for locking or securing the said fish plates upon the rail ends, the forward locking means being capable of movement in an unlocking direction to permit of the removal of the fish plates from the rails.

With the above and other objects in view, the improvement resides in the construction, combination and arrangement of parts set forth in the following specification and falling within the scope of the appended claims.

In the drawings: Figure 1 is a perspective view of two rails constructed in accordance with the present invention, Fig. 2 is an elevation of the same looking toward the opposite side of the joint, Fig. 3 is a horizontal sectional view approximately on the line 3—3 of Fig. 2, Fig. 4 is a transverse sectional view approximately on the line 4—4 of Fig. 2, Fig. 5 is a detail perspective view of one of the rail ends, Fig. 6 is a similar view of one of the fish plates looking toward the inner face thereof, Fig. 7 is a similar view of a second or coacting fish plate, also looking toward the inner face thereof, and Fig. 8 is a view of the tool for operating the locking means to permit of the separation of the fish plates from the rails.

Referring now to the drawings in detail, 1 and 2 designate the ends of two railway rails. Each of the rails is of the ordinary construction, and each of said rails at a suitable distance from its end is provided with a pair of spaced transverse slots or openings 3 and 4 respectively, the openings 3 being arranged nearer the ends of the rails than are the openings 4.

Either integrally formed or secured to the opposite faces of the webs of the rails 1 and 2, at a suitable distance to the rear of the openings 4 therein, is a flat spring member 5 which has its free end, which is arranged adjacent one of said openings 4, provided with a laterally extending lug or bolt 6 that projects beyond the opposite side of the said web a suitable distance through an elongated slot 7. Each of the spring members 5 at its end provided with the lug or bolt has its outer face formed with a substantially U-shaped member or bar 8.

The numeral 9 designates one of the fish plates, the same having its opposite longitudinal edges beveled to snugly engage beneath the heads of the rails as well as to contact with the base flanges of said rails, and integrally formed with the said plate 9 are substantially U-shaped members or bails 10 which equal in number with the openings in the rail ends and which are adapted to project through the said openings. The upper and lower members of each of the bails 10 are substantially horizontally straight, the upper member 11 being of a less length than the lower member 12, so that the connecting member 13 of each of the bails 10 is arranged at an angle with respect to the inner and vertically straight face of the fish plate 9. These members 10 project a distance beyond the webs of the rails opposite the plate 9, sufficient to receive the second fish plate 14 which is slid longitudinally of the rails and contacts with the inner walls of the bails and with the webs of the rails, the said fish plate also engaging beneath the heads and against the base flanges of said rails. To accommodate this the slots or openings 3 and 4 may partially enter the heads and the base flanges of the rails.

The plate 9 upon its inner face and adjacent one of its ends is provided with an elongated depression 15 which is adapted to receive the bolt 6 of the rail 2 and the opposite end of said plate is provided with a slot or opening 16 to receive the bail 8 of the spring plate arranged upon the rail 1. The inner wall of the slot or opening 16 is beveled, as indicated by the numeral 17 and the inner face of the said plate is grooved from its end longitudinally toward the said opening 16, as indicated by the numeral 18.

The plate 9 is arranged upon the rails by merely placing the same within the fishing spaces of the rails, permitting the bails to pass through the openings 3 and 4 so that the depression 15 will receive the bolt of the spring upon the rail 2, and the bail 8 of the spring upon the rail 1 will be disposed within the opening 16. The inner face of the plate 14 is centrally provided with a longitudinally extending groove 19 and has one of its ends provided with a depression or pocket 20 and its other end bifurcated, as at 21, and the said inner face being inclined or beveled from the arms provided by the bifurcation toward the channel 19, as indicated by the numeral 22.

The plate 14 is first arranged longitudinally of the rails, its bifurcated end 21 being positioned adjacent the projecting bolt of the rail 2, and the beveled or inclined surface 22 forces the said pin through the opening in the rail 1 provided therefor, against the pressure of the spring 5 to allow the plate 14 to pass through the bails 10, the end of said pin riding in the longitudinal groove 16 and contacting the inner wall provided thereby. When the plate has been slid its proper distance upon the rails the pin of the rail 1 will engage within the pocket 20 of the said plate 14 and the end wall of the bifurcated portion 21 of the said plate 14 will contact with the offset member 8 of the spring 5 of the rail 2, thus locking the plate 14 upon the rails against either longitudinal movement, the inner walls of the bails 10 forcing the said plate against the sides of the rails and preventing the lateral movement of the said plate.

The tool, indicated by the numeral 25, and illustrated in Fig. 8 of the drawings may have either of its curved ends engage the offset bail of the spring upon the rail 2, the said tool being passed through the opening 16 in the plate 9, so the bolt of the said spring will be brought out of the pocket of the plate 14 to permit of the plate 14 being slid longitudinally of the rails out of engagement with the bails of the plate 9, and the said plate 9 is moved laterally of the rails to bring the said bails out of engagement with the openings 3 and 4. It will thus be noted that the inner wall of the slotted portion 21 of the plate 14 contacting with the bail or U-shaped member of the spring of the rail 1 serves as a stop for limiting the movement of the said plate 14 in a longitudinal direction and the said plate is brought into locking position between the bails of the plate 9 and one of the faces of the rails.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

1. In a rail joint, the combination with two rails having abutting ends, the said rails having a plurality of transverse openings, bolt members upon the rails, springs for forcing the bolts beyond the webs of each of the rails, fish plates, one of said fish plates being provided with laterally extending bails which are adapted to pass through the openings in the rails and project beyond the opposite sides thereof, said fish plate having its inner face formed with a pocket to receive one of the spring pressed bolts, the other fish plate also having its inner face provided with a pocket and adapted to be moved longitudinally of the rails between the said rails and the bails and to have its pocket receive the spring pressed bolt of the second mentioned rail.

2. In a rail joint, two rails having registering openings, both of said rails having their webs and a portion of their heads and base flanges provided with transverse openings, each of the rails having its web provided with a longitudinally extending spring member, the free end of which being provided with a bolt which passes through an elongated opening in the web of the said rail and the said bolts entering from the opposite sides of the respective rails, and each of the said springs being further provided with U-shaped members, fish plates, one of said fish plates having one of its ends channeled and provided with a slot and being further provided with a plurality of bails which are adapted to pass through the openings in the rails, the inner face of the said member being further provided with a pocket to engage the projecting bolt of one of the rails, and the openings in the said fish plate adapted to receive the U-shaped member of one of the springs of one of the rails, the second fish plate having one of its ends bifurcated and provided with a longitudinally extending groove terminating in a pocket and the said groove having its walls beveled toward the said bifurcated end, said plate adapted to be moved longitudinally within the projecting bails of the first mentioned plate and to have its pocket receive the projecting bolt of the second rail.

In testimony whereof I affix my signature in presence of two witnesses.

MICHAEL PUSATERI.

Witnesses:
A. M. SMITH,
T. A. BELL.

Copies of this patent may be obtained for five cents each, by addressing the "Commissioner of Patents, Washington, D. C."